(12) United States Patent
Kim et al.

(10) Patent No.: US 9,499,060 B2
(45) Date of Patent: Nov. 22, 2016

(54) POWER CONVERSION DEVICE

(71) Applicant: LSIS CO., LTD., Anyang-si, Gyeonggi-do (KR)

(72) Inventors: Woo Sup Kim, Seoul (KR); Jae Ho Lee, Bucheon-si (KR); Hong Tae Park, Cheongju-si (KR); Young Min Kim, Seoul (KR)

(73) Assignee: LSIS CO., LTD., Anyang-si (KR)

( * ) Notice: Subject to any disclaimer, the term of this patent is extended or adjusted under 35 U.S.C. 154(b) by 178 days.

(21) Appl. No.: 14/454,515

(22) Filed: Aug. 7, 2014

(65) Prior Publication Data

US 2015/0175021 A1    Jun. 25, 2015

(30) Foreign Application Priority Data

Dec. 20, 2013 (KR) .................. 10-2013-0160675

(51) Int. Cl.
*H02J 7/00* (2006.01)
*B60L 11/18* (2006.01)
*H02J 7/02* (2016.01)

(52) U.S. Cl.
CPC .......... *B60L 11/1812* (2013.01); *H02J 7/0022* (2013.01); *H02J 7/0054* (2013.01); *H02J 7/022* (2013.01); *B60L 11/1811* (2013.01); *B60L 11/1868* (2013.01)

(58) Field of Classification Search
CPC ............ H02J 3/32; H02J 7/02; H02J 7/0003; H02J 7/0009; H02J 7/0052; H02J 7/0065; Y02T 90/127; B60L 11/1811; B60L 11/1812; B60L 11/1868; H02M 3/33569
USPC .................. 320/107, 109–111, 137–138, 163
See application file for complete search history.

(56) References Cited

U.S. PATENT DOCUMENTS

| | | |
|---|---|---|
| 2011/0168462 A1 | 7/2011 | Stanek et al. |
| 2011/0169448 A1* | 7/2011 | Ichikawa ............... B60K 6/445 |
| | | 320/109 |
| 2011/0273136 A1 | 11/2011 | Yoshimoto |

(Continued)

FOREIGN PATENT DOCUMENTS

| | | |
|---|---|---|
| CN | 102282749 | 12/2011 |
| EP | 2596982 | 5/2013 |
| JP | 07-115732 | 5/1992 |

(Continued)

OTHER PUBLICATIONS

European Patent Office Application Serial No. 14188735.6, Search Report dated May 11, 2015, 6 pages.

(Continued)

*Primary Examiner* — Paul Dinh
(74) *Attorney, Agent, or Firm* — Lee, Hong, Degerman, Kang & Waimey

(57) ABSTRACT

A power conversion device for charging first and second batteries is provided. The power conversion device includes an input unit, a first power conversion unit, a second power conversion unit, a third power conversion unit, and a switching unit connecting the first power conversion unit to the second power conversion unit in the first operation mode according to a control signal supplied from the outside, the switching unit connecting the second power conversion unit to the third power conversion unit in the second operation mode according to the control signal supplied from the outside.

6 Claims, 5 Drawing Sheets

(56) References Cited

U.S. PATENT DOCUMENTS

2012/0049793 A1* 3/2012 Ross .................. H01M 10/44
320/109
2015/0130423 A1* 5/2015 Tajima ................ B60L 11/1801
320/137

FOREIGN PATENT DOCUMENTS

| JP | 09-65509 | 3/1997 |
| JP | 2008-312395 | 12/2008 |
| JP | 2011-244523 | 12/2011 |

OTHER PUBLICATIONS

Japan Patent Office Application Serial No. 2014-180345, Office Action dated Oct. 20, 2015, 3 pages.
State Intellectual Property Office of the People's Republic of China Application Serial No. 201410575745.0, Office Action dated Jun. 22, 2016, 8 pages.

\* cited by examiner

POWER CONVERSION DEVICE

CROSS-REFERENCE TO RELATED APPLICATIONS

Pursuant to 35 U.S.C. §119(a), this application claims the benefit of earlier filing date and right of priority to Korean Patent Application No. 10-2013-0160675, filed on Dec. 20, 2013, the contents of which are hereby incorporated by reference in its entirety.

BACKGROUND

The present disclosure relates to a power conversion device, and particularly, to a power conversion device for charging each of a high voltage battery and a low voltage battery.

Power conversion devices are provided in plug-in hybrid electric vehicles (PHEVs) or general battery electric vehicles (BEVs). Such a power conversion device may be system receiving a commercial alternating current (AC) power from the outside to charge a high voltage battery for driving electric vehicles. The high voltage battery may be charged through an on board charger (OBC) mounted within electric vehicles.

A power conversion device converts a commercial AC power into a direct current (DC) power through full-wave rectification to adjust a power factor of the converted DC power by using an active filter. Then, the DC power of which the power factor is adjusted is converted into high frequency AC power by using an inverter. Thereafter, the high frequency AC power is converted into a DC power via a transformer to charge the high voltage battery for supplying a power required for driving electric vehicles.

The power conversion device includes a high-speed switching circuit that switches an inputted DC voltage at a high speed to convert the switched DC voltage into a high frequency AC power, thereby outputting the converted high frequency AC power.

In electric vehicles, a low voltage battery supplying a power to a power system for electric device is charged by reducing an output of a high voltage battery supplying a power for driving vehicles through a DC-DC converter circuit. The high efficiency DC-DC converter circuit includes a high-speed switching circuit that switches an inputted DC voltage at a high speed to convert the DC voltage into a high frequency AC power to output the converted high frequency AC power.

Therefore, a charger for charging the high voltage battery and a charger for charging the low voltage battery are mounted within the electric vehicle.

FIG. 1 is a circuit diagram of a power conversion device according to a related art.

Referring to FIG. 1, a power conversion device according to the related art includes an input unit 11, a first input switching unit 12, a first transformation unit 13, and a first output rectification unit 14. a first output filter 15, a high voltage battery 16, an input filter 21, a second input switching unit 22, a second transformation unit 23, a second output rectification unit 24, a second output filter 25, and a low voltage battery 26.

In an operation of the power conversion device, the commercial AC power is supplied into the input unit 11.

The input unit 11 rectifies a full-wave of the commercial AC power to convert the rectified commercial AC power into the DC power, thereby adjusting a power factor of the DC power to output the DC power of which the power factor is adjusted.

The first input switching unit 12 is constituted by a plurality of switches to convert the DC power outputted through the input unit 11 into an AC square wave.

The first transformation unit 13 is a transformer. The first transformation unit 13 transforms the power outputted through the first input switching unit 12.

The power outputted through the first transformation unit 13 is rectified through the first output rectification unit 14 and filtered through the first output filter 15. The high voltage battery 16 is charged with the filtered power.

Similarly, the input filter 21 filters the power outputted by an electrical discharge of the high voltage battery 16

As described above, the filtered power is supplied through the second input switching unit 22, the second transformation unit 23, the second output rectification unit 24, and the second output filter 25 to charge the low voltage battery 26 through the input filter 21.

The above-described power conversion apparatus according to a related art includes the first charger-input unit 11, the first input switching unit 12, the first transformation unit 13, the first output rectification unit 14, the first output filter 15, and the high voltage battery 16 for charging the high voltage battery, and the second charger-input filter 21, the second input switching unit 22, the second transformation unit 23, the second output rectification unit 24, the second output filter 25, and the low voltage battery 26 for charging the low voltage battery.

Here, in the power conversion device according to the related art, since the switching unit, the rectification unit, and the filter, which perform the same function, are provided in each of first and second chargers, the power conversion device mounted within the electric vehicle may increase in volume, and also the product may increase in price.

SUMMARY

Embodiments provide a power conversion device that is capable of sharing a portion of elements of a first charger for charging a high voltage battery and a second charger for charging a low voltage battery.

Embodiments also provide a power conversion device that is capable of charging a high voltage battery and a low voltage battery by using one switching unit and a filter In one embodiment, a power conversion device for charging first and second batteries includes an input unit converting a commercial alternating current (AC) power supplied from the outside into a direct current (DC) power to output the converted DC power; a first power conversion unit converting the DC power converted through the input unit into an AC power to output the converted AC power; a second power conversion unit converting the AC power converted through the first power conversion unit into a DC power to charge the first battery in a first operation mode, the second power conversion unit converting the DC power outputted through the first battery into an AC power in a second operation mode; a third power conversion unit converting the AC power converted through the second power conversion unit into a DC power to charge the second battery in the second operation mode; and a switching unit connecting the first power conversion unit to the second power conversion unit in the first operation mode according to a control signal supplied from the outside, the switching unit connecting the second power conversion unit to the third power conversion unit in the second operation mode according to the control signal supplied from the outside.

In the first operation mode, the third power conversion unit may be stopped in operation as the third power conversion unit is not connected to the switching unit, and in the second operation mode, the first power conversion unit may be stopped in operation as the first conversion unit is not connected to the switching unit.

The second power conversion unit may include a first common circuit and a second common circuit which operate in the first and second operation modes.

The first common circuit may rectify the AC power outputted through the first power conversion unit to convert the rectified AC power into the DC power in the first operation mode and convert the DC power outputted through the second common circuit into the AC power in the second operation mode.

The second common circuit may function as an output filter with respect to the DC power supplied to the first battery in the first operation mode and function as an input filter with respect to the DC power supplied to the first common circuit in the second operation mode.

The first common circuit may be constituted by a plurality of active switching elements.

In another embodiment, a power conversion device includes: a first switching element; a second switching element including a drain electrode connected to a source electrode of the first switching element and a source electrode connected to a source electrode of a fourth switching element; a third switching element including a drain electrode connected to a drain electrode of the first switching element and a source electrode of a drain electrode of the fourth switching electrode; the fourth switching element including the drain electrode connected to the source electrode of the third switching element and the source electrode connected to the source electrode of the second switching element; an inductor of which one end is connected to the drain electrode of the third switching element and the other end is connected to one end of a first capacitor and one end of a high voltage battery; a capacitor of which one end is connected to the other end of the inductor and the other end is connected to the other end of the high voltage battery and the source electrode of the fourth switching element; and a switch of which one end is selectively connected to any one of a high voltage charger and a low voltage charger and the other end is connected between the source electrode of the first switching element and the drain electrode of the second switching element.

Each of the first to fourth switching elements may include an active switching element.

Each of the first to fourth switching elements may function as a rectifier when the one end of the switch is connected to the high voltage charger and function as an input switching unit converting the DC power into the AC power when the one end of the switch is connected to the low voltage charger.

Each of the inductor and the capacitor may function as an output filter of the high voltage charger when the one end of the switch is connected to the high voltage charger and function as an input filter of the low voltage charger when the one end of the switch is connected to the low voltage charger.

The details of one or more embodiments are set forth in the accompanying drawings and the description below.

Other features will be apparent from the description and drawings, and from the claims.

DETAILED DESCRIPTION OF THE EMBODIMENTS

Figure 1:
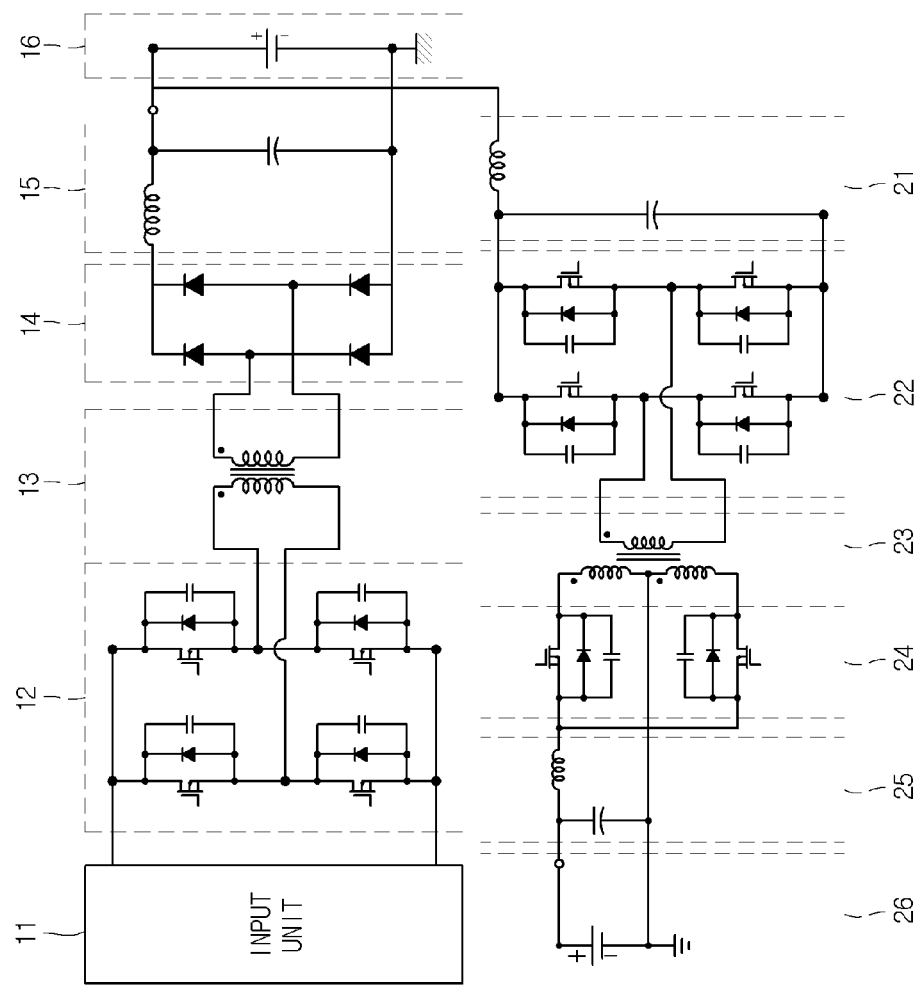
FIG. 1 is a circuit diagram of a power conversion device according to a related art.

Advantages and features of the embodiment, and implementation methods thereof will be clarified through following embodiments described with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the embodiment to those skilled in the art. Further, the present disclosure is only defined by scopes of claims. Like reference numerals refer to like elements throughout.

In the following description, detailed descriptions of well-known functions or constructions will be omitted since they would obscure the invention in unnecessary detail. Also, the terms used herein are defined according to the functions of the present disclosure. Thus, the terms may vary depending on user's or operator's intentions or practices. Therefore, the terms used herein must be understood based on the descriptions made herein.

Figure 2:
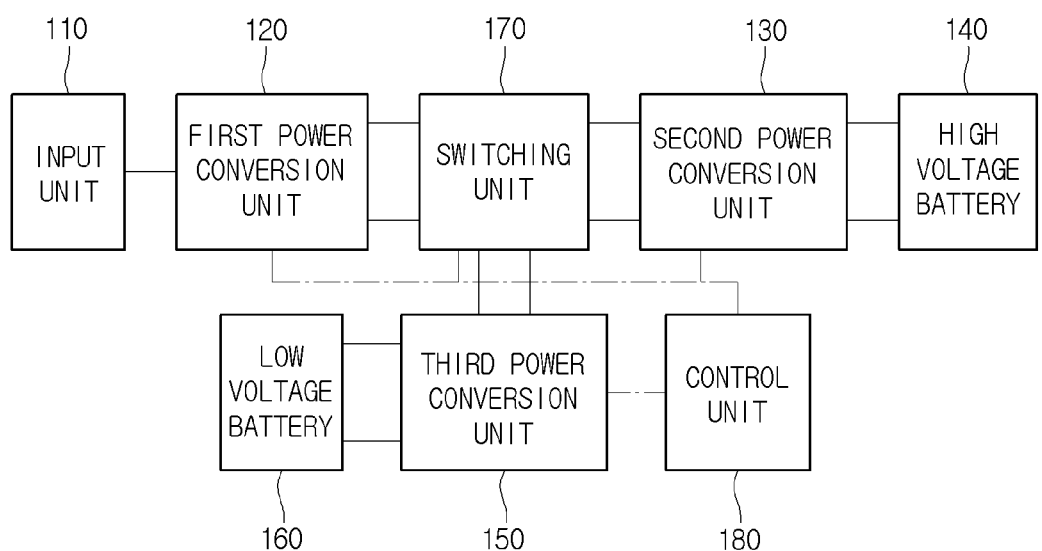
FIG. 2 is a schematic block diagram of a power conversion device according to an embodiment.

FIG. 2 is a schematic block diagram of a power conversion device according to an embodiment.

Referring to FIG. 2, the power conversion device includes an input unit 110, a first power conversion unit 120, a second power conversion unit 130, a high voltage battery 140, a third power conversion unit 150, a low voltage battery 160, a switching unit 170, and a control unit 180

The input unit 110 receives a commercial alternating current (AC) power from the outside to convert the received AC power into a direct current (DC) power and outputs the DC power.

Thus, the input unit 110 includes an input filter for blocking overcurrent of the inputted commercial AC power, a rectifier for rectifying the AC power outputted from the input filter to output the rectified AC power, and a power factor correction circuit (PFC) for correcting a power factor of the power rectified through the rectifier to output the corrected power.

The input filter may be provided with at least one inductor.

The rectifier may include a bridge rectifier. Here, since a plurality of diodes constituting the bridge rectifier may be turned on at only a voltage equal to or greater than a predetermined driving voltage to output an input power, the output power of the rectifier may not form a square wave. Thus, the power is not inputted to an element disposed on a rear end of the rectifier for a certain time to reduce the power factor.

Therefore, the power factor correction circuit corrects the power factor of the DC power outputted through the rectifier. Here, the power factor correction circuit includes at least one inductor to correct the power factor. Energy is stored in the inductor. The power factor correction circuit stores energy in the inductor and supplies the energy to the elements disposed on the rear end of the rectifier when the power is not inputted as described above, to correct the power factor.

Thus, the power factor correction circuit includes the inductor connected to the rectifier, a transistor that selectively switches according to a control signal of the control unit 180 to output the energy stored in the inductor, and the diode for preventing the current from flowing in a reverse direction.

The first power conversion unit 120 converts the DC power outputted through the input unit 110 into an AC power and outputs the AC power.

Here, the first power conversion unit 120 is constituted by a plurality of switching elements. The first power conversion unit 120 includes an input switching part 121 converting the DC power outputted through the input unit 110 into the AC power and a first transformer 122 transforming the AC power outputted through the input switching part 121.

The first power conversion unit 120 converts the DC power outputted through the input unit 110 into the AC power that is appropriate for charging the high voltage battery 140 and outputs the AC power.

The second power conversion unit 130 is connected to the first power conversion unit 120 in a first operation mode. Thus, the second power conversion unit converts the AC power outputted through the first conversion unit 120 into a DC power for charging the high voltage battery 140.

The high voltage battery 140 is charged by the DC power outputted through the second power conversion unit 130 in the first operation mode.

The high voltage battery 140 may be a fuel cell. The high voltage battery 140 may generate a DC power stored therein in a manner in which electric energy is generated through a chemical reaction between hydrogen (H2) and oxygen (O2) contained in air and stored in a stack. Also, the high voltage battery 140 may be charged by the DC power supplied through the second power conversion unit 130.

The second power conversion unit 130 receives the DC power from the high voltage battery 140 in a second operation mode. Thus, the second power conversion unit 130 converts the received DC power into an AC power and outputs the AC power.

Here, the AC power outputted through the second power conversion unit 130 is supplied into the third power conversion unit 150 in the second operation mode.

That is, the second power conversion unit 130 is connected to the first power conversion unit 120 in the first operation mode, and thus the second power conversion unit 130 converts the AC power outputted through the first conversion unit 120 into the DC power to supply the DC power to the high voltage battery 140.

Also, the second power conversion unit 130 is connected to the third power conversion unit 150 in the second operation mode, and thus the second power conversion unit 130 converts the DC power outputted through the high voltage battery 140 into the AC power to supply the AC power to the third power conversion unit 150.

The high voltage battery 140 is charged by the DC power outputted through the second power conversion unit 130 in the first operation mode. Also, the high voltage battery 140 is discharged to supply the DC power to the second power conversion unit 130 in the second operation mode.

The third power conversion unit 150 converts the AC power supplied through the second power conversion unit 130 into a DC power for charging the low voltage battery 160 and supplies the converted DC power to the low voltage battery 160.

The third power conversion unit 150 includes a second transformer 151 for transforming the AC power supplied through the second conversion unit 130, a rectifier 152 for rectifying the AC power transformed through the second transformer 151 to output the DC power, and an output filter 153 for filtering the rectified DC power.

The switching unit 170 determines an operation mode of the second power conversion unit 130. That is, the switching unit 170 is disposed between the second power conversion unit 130 and the first power conversion unit 120 to connect the second power conversion unit 130 to the first power conversion unit 120 in the first operation mode.

Also, the switching unit 170 is disposed between the second power conversion unit 130 and the third power conversion unit 150 to connect the second power conversion unit 130 to the third power conversion unit 150 in the second operation mode.

Therefore, the third power conversion unit 150 is not electrically connected to the second power conversion unit 130 by the switching unit 170 in the first operation mode, and thus the third power conversion unit 150 does not perform a separate operation.

Also, the first power conversion unit 120 is not electrically connected to the second power conversion unit 130 by the switching unit 170 in the second operation mode, and thus the first power conversion unit 120 does not perform a separate operation.

The control unit 180 controls an overall operation of the power conversion device.

The control unit 180 controls a switching operation of a switching element included in the power factor correction circuit constituting the input unit 110 to correct the power factor of power outputted through the input unit 110.

The control unit 180 controls a switching operation of switching elements provided in the first power conversion unit 120 to control a power conversion of the first power conversion unit 120.

The control unit 180 controls a switching operation of switching elements provided in the second power conversion unit 130 to control a power conversion of the second power conversion unit 130.

Also, the control unit 180 controls a switching operation of switching elements provided in the third power conversion unit 150 to control a power conversion of the third power conversion unit 130.

The control unit 180 controls a switching operation of the switching unit 170 to determine an operation mode of the second power conversion unit 130.

That is, the control unit 180 controls to allow the switching unit 170 to connect the first power conversion unit 120 to the second power conversion unit 130 in the first operation mode in which the high voltage battery 140 needs to be charged, and thus the second power conversion unit 130 operates as a power conversion unit for charging the high voltage battery.

Alternatively, the control unit 180 controls to allow the switching unit 170 to connect the second power conversion unit 130 to the third power conversion unit 150 in the second operation mode in which the low voltage battery 160 needs to be charged, and thus the second power conversion unit 130 operates as a power conversion unit for charging the low voltage battery.

Here, the control unit 180 may check the present state of the electric vehicle to determine the first operation mode for charging the high voltage battery 140 and the second operation mode for charging the low voltage battery 160 according to the checked state of the current electric vehicle.

For example, when a commercial AC power is connected to the input unit 110, the control unit 180 recognizes the state as the first operation mode. Thus, the control unit 180 may allow the switching unit 170 to connect the first power conversion unit 120 to the second power conversion unit 130.

As described above, according to an embodiment, the second power conversion unit 130 is connected to the first power conversion unit 120 in the first operation mode to function as the high voltage charger for charging the high voltage battery. Also, the second power conversion unit 130 is connected to the third power conversion unit 150 in the second operation mode to function as the low voltage battery charger for charging the low voltage battery.

According to an embodiment, since a power transmission path is changed by using the switching unit in the structure in which the low voltage battery is integrated with the high voltage battery, portions of elements constituting the existing circuit may be removed to simplify a structure of the circuit and reduce a volume and costs of the power conversion device.

Figure 3:
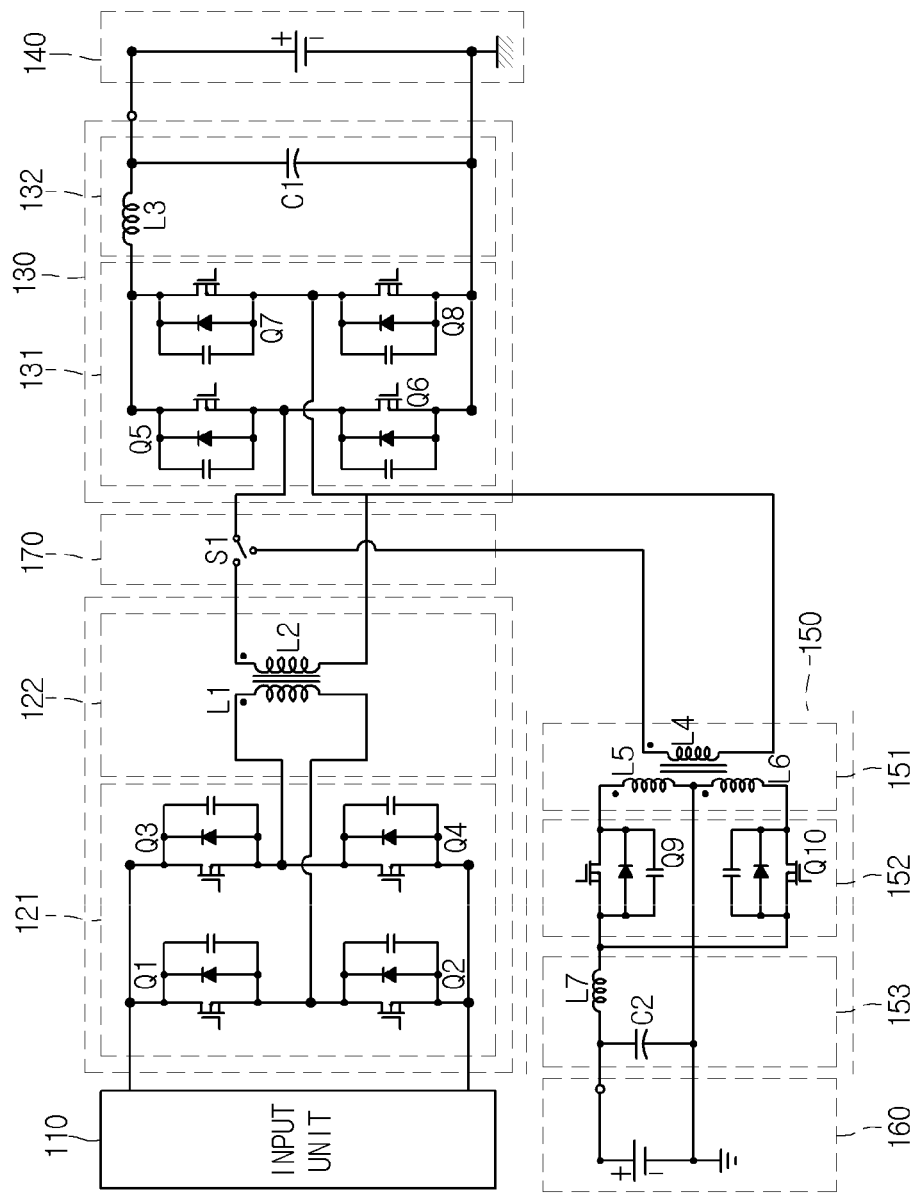
FIG. 3 is a detailed circuit diagram of the power conversion device illustrated in FIG. 2.

FIG. 3 is a detailed circuit diagram of the power conversion device illustrated in FIG. 2.

A detailed circuit of the power conversion device of an embodiment will be described with reference to FIG. 3.

Referring to FIG. 3, the power conversion device includes the input unit 110, an input switching part 121, a first transformer 122, a first common circuit part 131, a second common circuit part 132, the high voltage battery 140, the second transformer 151, the rectifier 152, the output filter 153, the low voltage battery 160, and the switching unit 170.

Since the input unit 110 includes the input filter, the rectifier, and the power factor correction circuit as described above, detailed description with respect to the input filter, the rectifier, and the power factor correction circuit will be omitted.

The input switching part 121 includes a first switching element Q1, a second switching element Q2, a third switching element Q3, and a fourth switching element Q4.

A gate electrode of the first switching element Q1 is connected to the control unit 180 to receive a switching signal.

The first switching element Q1 includes a drain electrode connected to a first node (a positive power node) and a source electrode connected to a drain electrode of the second switching element Q2.

The second switching element Q2 includes the drain electrode connected to the source electrode of the first switching element Q1 and a source electrode connected to a second node (a negative power node) of the input unit 110.

The third switching element Q3 includes a drain electrode connected to the drain electrode of the first switching element Q1 and a source electrode connected to a drain electrode of the fourth switching element Q4.

The fourth switching element Q4 includes the drain electrode connected to source electrode of the third switching element Q3 and a source electrode connected to the source electrode of the second switching element Q2.

Gate electrodes of the first to fourth switching elements Q1 to Q4 are connected to the control unit 180 to receive a gate signal from the control unit 180.

Each of the first to fourth switching elements Q1 to Q4 includes a body diode of which one end is connected to the drain electrode and the other end is connected to the source electrode and a body capacitor.

The first transformer 122 includes a first inductor L1 and a second inductor L2.

A first terminal of the first inductor L1 is connected between the source electrode of the third switching element Q3 and the drain electrode of the fourth switching element Q4. Also, a second terminal of the first inductor L1 is connected between the source electrode of the first switching element Q1 and the drain electrode of the second switching element Q2.

A first terminal of the second inductor L2 is connected to a first terminal of the switching unit 170, and a second terminal of the second inductor L2 is connected between a source electrode of a seventh switching element Q7 and a drain electrode of a eighth switching element Q8 which are described below.

The first terminal of the switching unit 170 is connected to the first terminal of the second inductor L2 or to a following first terminal of a fourth inductor L4. A second terminal of the switching unit 170 is connected between a source electrode of a fifth switching element Q5 and a drain electrode of a sixth switching element Q6.

The first common circuit part 131 includes the fifth switching element Q5, the sixth switching element Q6, the seventh switching element Q7, and the eighth switching element Q8.

The fifth switching element Q5 includes a drain electrode connected to a drain electrode of the seventh switching element Q7 and the source electrode connected to the drain electrode of the sixth switching element Q6.

The sixth switching element Q6 includes the drain electrode connected to the source electrode of the fifth switching element Q5 and a source electrode connected to a source electrode of the eighth switching element Q8.

The seventh switching element Q7 includes the drain electrode connected to the drain electrode of the fifth switching element Q5 and the source electrode connected to the drain electrode of the eighth switching element Q8.

The eighth switching element Q8 includes the drain electrode connected to the source electrode of the seventh switching element Q7 and the source electrode connected to the source electrode of the sixth switching element Q6.

The fifth to eighth switching elements Q5, Q6, Q7, and Q8 rectify the AC power outputted through the first transformer 122 and output the rectified AC power in the first operation mode.

Thus, the first common circuit part 131 may function as a rectifier in the first operation mode.

Also, the fifth to eighth switching elements Q5, Q6, Q7, and Q8 convert the DC power outputted through the high voltage battery 140 into the AC power in the second operation mode.

Thus, the first common circuit part 131 may perform the same function as the input switching part 121 in the second operation mode.

The second common circuit part 132 includes a third inductor L3, a first capacitor C1.

One end of the third inductor L3 is connected to the drain electrode of the seventh switching element Q7, and the other end is connected to one end of the capacitor C1.

The one end of the first capacitor C1 is connected to the other end of the third inductor L3, and the other end is connected to the source electrode of the eighth switching element Q8.

The third inductor L3 and the first capacitor C1 are filters for filtering the DC power rectified through the first common circuit part 131 in the first operation mode.

Thus, the second common circuit part 132 may function as an output filter constituting a high-voltage battery charger in the first operation mode.

The third inductor L3 and the first capacitor C1 are filters for filtering the DC power outputted through the high voltage battery 140 in the second operation mode.

Thus, the second common circuit part 132 may function as an input filter constituting a low-voltage battery charger in the second operation mode.

The second power conversion unit 150 includes the second transformer 151, the rectifier 152, and the output filter 153.

The second transformer 151 includes the fourth inductor L4, a fifth inductor L5, and a sixth inductor L6.

The fourth inductor L4 is selectively connected to one end of the switching unit 170. One end of the fourth inductor L4 is connected between the source electrode of the fifth switching element Q5 and the drain electrode of the sixth switching element, and the other end is connected to the source electrode of the seventh switching element Q7 and the drain electrode of the eighth switching element Q8.

One end of the fifth inductor L5 is connected to a drain electrode of a ninth switching element Q9, and the other end is connected to one end of the sixth inductor L6.

The one end of the sixth inductor L6 is connected to the other end of the fifth inductor L5, and the other end is connected to a drain electrode of a tenth switching element Q10.

The rectifier 152 includes the ninth and tenth switching elements Q9 and Q10.

The drain electrode of the ninth switching element Q9 is connected to the one end of the fifth inductor L5. A source electrode of the ninth switching element Q9 is connected to one end of a seventh inductor L7.

The drain electrode of the tenth switching element Q10 is connected to the other end of the sixth inductor L6. A source electrode of the tenth switching element Q10 is connected to the one end of the seventh inductor L7.

The output filter 153 includes the seventh inductor L7 and a second capacitor C2.

The seventh inductor L7 has the one end that is connected to the source electrode of the ninth switching element Q9 and the source electrode of the tenth switching element Q10 and the other end that is connected to the one end of the second capacitor C2.

The second capacitor C2 has the one end connected to the other end of the seventh inductor L7 and the other end connected between the other end of the fifth inductor L5 and the one end of the sixth inductor L6.

Figure 4:
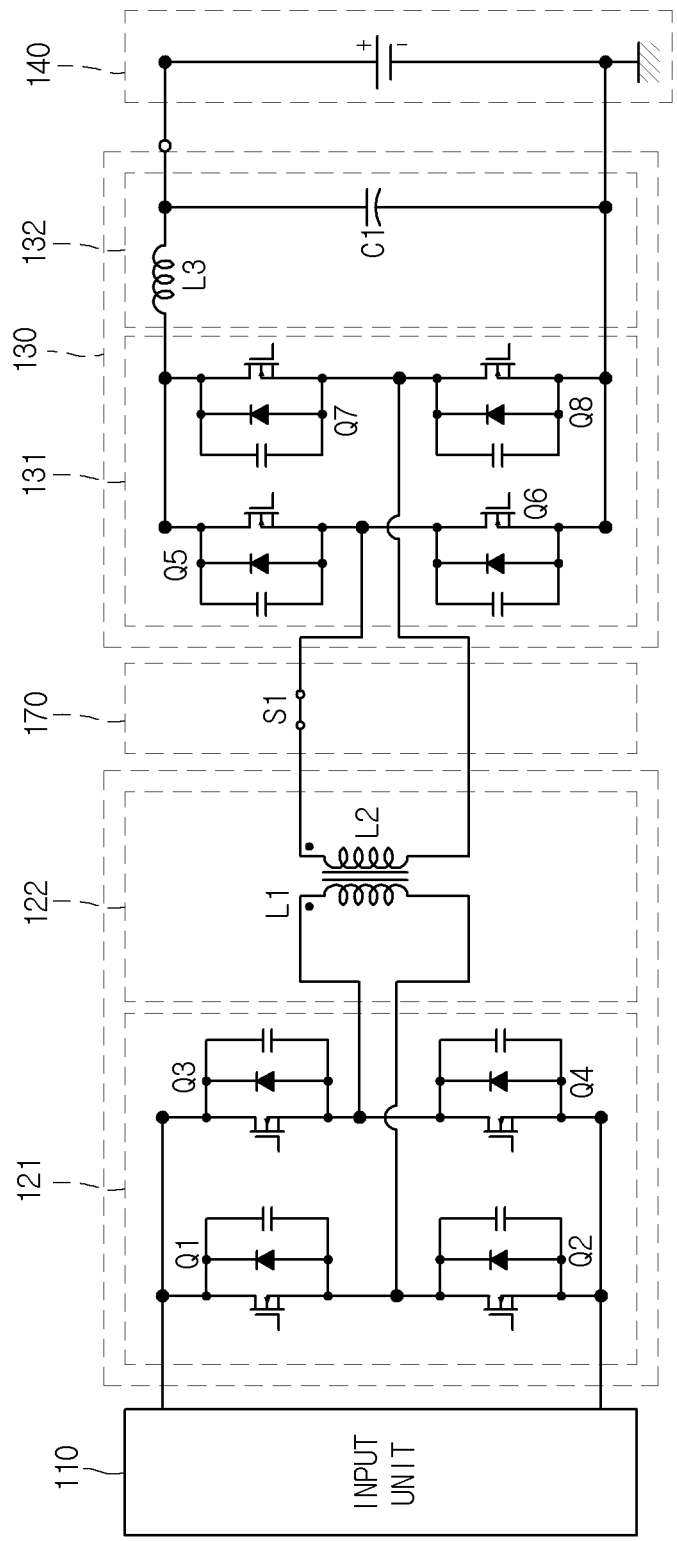
FIG. 4 is a circuit diagram illustrating an operation for charging a high voltage battery according to an embodiment.
Figure 5:
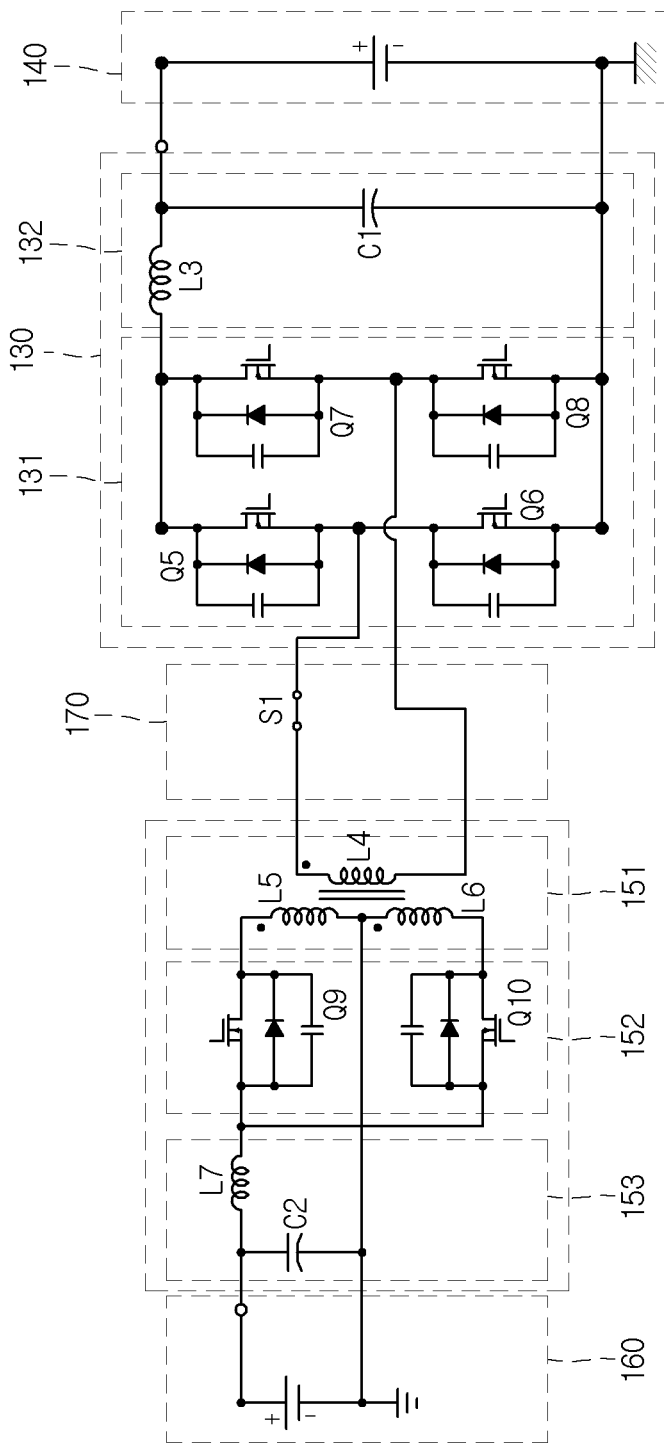
FIG. 5 is a circuit diagram illustrating an operation for charging a low voltage battery according to an embodiment.

FIG. 4 is a circuit diagram illustrating an operation for charging a high voltage battery according to an embodiment, and FIG. 5 is a circuit diagram illustrating an operation for charging a low voltage battery according to an embodiment.

Referring to FIG. 4, the high voltage battery 140 is charged by the input unit 110, the first power conversion unit 120, the switching unit 170, and the second power conversion unit 130 in a charging operation mode of the high voltage battery 140.

That is, the input unit 110 receives a commercial AC power from the outside to rectify the received commercial AC power and correct the power factor to output the corrected AC power.

The first power conversion unit 120 converts the DC power with the power factor corrected into the AC power to output the converted AC power.

The DC power converted through the first power conversion unit 120 is provided to the second power conversion unit 130 connected through the switching unit 170.

The first common circuit part 131 rectifies the AC power outputted through the first conversion unit 120 to output the rectified the AC power.

The second common circuit part 132 filters the DC power rectified through the first common circuit part 131.

The DC power filtered through the second common circuit part 132 is supplied to the high voltage battery 140 to charge the high voltage battery 140.

Referring to FIG. 5, the low voltage battery 160 is charged by the high voltage battery 140, the second power conversion unit 130, the switching unit 170, and the third power conversion unit 150 in a charging operation mode of the low voltage battery 160.

The high voltage battery 140 is discharged in the charging operation mode of the low voltage battery 160. Thus, the high voltage battery 140 outputs the DC power charged therein.

When the DC power is outputted through the high voltage battery 140, the DC power is filtered by the second common circuit part 132 and supplied to the first common circuit part 131.

The first common circuit part 131 switches the DC power received through the second common circuit part 132 to convert the switched DC power into the AC power. Thus, the first common circuit part 131 outputs the converted AC power to the second transformer 151 connected through the switching unit 170.

The second transformer 151 transforms the AC power to output the transformed AC power to the rectifier 152.

The rectifier 152 rectifies the AC power outputted through the second transformer 151 to convert the rectified AC power into the DC power.

The converted DC power is supplied to the low voltage battery 160 through the output filter 153, thereby charging the low battery 160.

According to an embodiment, since the power transmission path of the power is changed by using the switching unit in the structure in which the low voltage battery is integrated with the high voltage battery, portions of elements constituting the existing circuit may be removed to simplify the structure of the circuit and reduce the volume and costs of the power conversion device.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A power conversion device for charging first and second batteries, the power conversion device comprising:
an input unit converting externally supplied commercial alternating current (AC) power into direct current (DC) power to output the converted DC power;

a first power conversion unit converting the DC power converted by the input unit into AC power to output the converted AC power;

a second power conversion unit converting the AC power converted by the first power conversion unit into DC power to charge the first battery in a first operation mode and converting the DC power output by the first battery into AC power in a second operation mode;

a third power conversion unit converting the AC power converted by the second power conversion unit into DC power to charge the second battery in the second operation mode; and a switching unit connecting the first power conversion unit to the second power conversion unit according to an externally supplied control signal in the first operation mode and connecting the second power conversion unit to the third power conversion unit according to the externally supplied control signal in the second operation mode.

2. The power conversion device according to claim 1, wherein:

the third power conversion unit is not connected to the switching unit in the first operation mode and operation of the third power conversion unit is stopped; and as the first conversion unit is not connected to the switching unit in the second operation mode and operation of the first power conversion unit is stopped.

3. The power conversion device according to claim 1, wherein the second power conversion unit comprises a first common circuit and a second common circuit which operate in the first and second operation modes.

4. The power conversion device according to claim 3, wherein the first common circuit rectifies the AC power output by the first power conversion unit to convert the rectified AC power into DC power in the first operation mode and converts the DC power output by the second common circuit into AC power in the second operation mode.

5. The power conversion device according to claim 3, wherein the second common circuit functions as an output filter with respect to the DC power supplied to the first battery in the first operation mode and functions as an input filter with respect to the DC power supplied to the first common circuit in the second operation mode.

6. The power conversion device according to claim 3, wherein the first common circuit comprises a plurality of active switching elements.

* * * * *